United States Patent [19]

Latourelle et al.

[11] Patent Number: 4,706,769
[45] Date of Patent: Nov. 17, 1987

[54] CONVERSION UNIT FOR ALL TERRAIN VEHICLES

[76] Inventors: Guy Latourelle, R. R. #1, Gracefield, Quebec; Jean-Claude Gauthier, 1950 3rd Avenue, Val Dor, Quebec, both of Canada

[21] Appl. No.: 817,612

[22] Filed: Jan. 10, 1986

[30] Foreign Application Priority Data

Jul. 5, 1985 [CA] Canada ................................... 486369

[51] Int. Cl.⁴ ............................................. B62D 55/04
[52] U.S. Cl. .................................. 180/9.21; 180/9.25; 180/9.26
[58] Field of Search ................... 180/9.21, 9.25, 9.26, 180/192, 215, 22

[56] References Cited

U.S. PATENT DOCUMENTS

| | | | |
|---|---|---|---|
| 1,273,906 | 7/1918 | Nickey | 280/248 |
| 1,337,905 | 4/1920 | Groves | 180/9.26 |
| 1,346,596 | 7/1920 | Doyle | 280/282 |
| 1,427,417 | 8/1922 | Rickey | 280/282 |
| 1,697,915 | 1/1929 | Fast | 180/9.26 |
| 3,157,913 | 11/1964 | Hubert | 180/9.25 |
| 3,285,626 | 11/1966 | Blonsky | 280/480 |
| 3,349,861 | 10/1967 | Oral | 180/9.54 |
| 3,369,624 | 2/1968 | Kauffmann | 180/9.54 |
| 3,544,128 | 12/1970 | Storm | 280/81 |
| 3,789,941 | 2/1974 | Robertson | 180/9.22 |
| 3,872,938 | 3/1975 | De Groot | 180/9.25 |
| 4,618,015 | 10/1986 | Yochum | 180/9.21 |
| 4,635,740 | 1/1987 | Krueger et al. | 180/9.21 |

FOREIGN PATENT DOCUMENTS

| | | |
|---|---|---|
| 412663 | 5/1943 | Canada . |
| 501816 | 4/1954 | Canada . |
| 640165 | 4/1962 | Canada . |
| 918711 | 1/1973 | Canada . |
| 960259 | 12/1974 | Canada . |
| 983065 | 2/1976 | Canada . |
| 1190572 | 7/1985 | Canada . |
| 460062 | 5/1928 | Fed. Rep. of Germany . |

Primary Examiner—John A. Pekar
Attorney, Agent, or Firm—D. Ian Makinson; Martin P. Hoffman; Karen M. Gerken

[57] ABSTRACT

There is disclosed a conversion unit for attachment to an all terrain vehicle to convert it into a track laying vehicle. A subframe is attached to the rear of the track laying vehicle, and two idler wheels are mounted on the subframe. Spring strut means extend downwardly from an upper portion of the vehicle to the subframe and bias the latter downwardly. The unit is quickly and easily attached to an all terrain vehicle and as easily removed. It is possible to improve the luggage carrying capacity of the all terrain vehicle and to improve its safety. No special tools are required for installation or dismounting of the unit.

6 Claims, 8 Drawing Figures

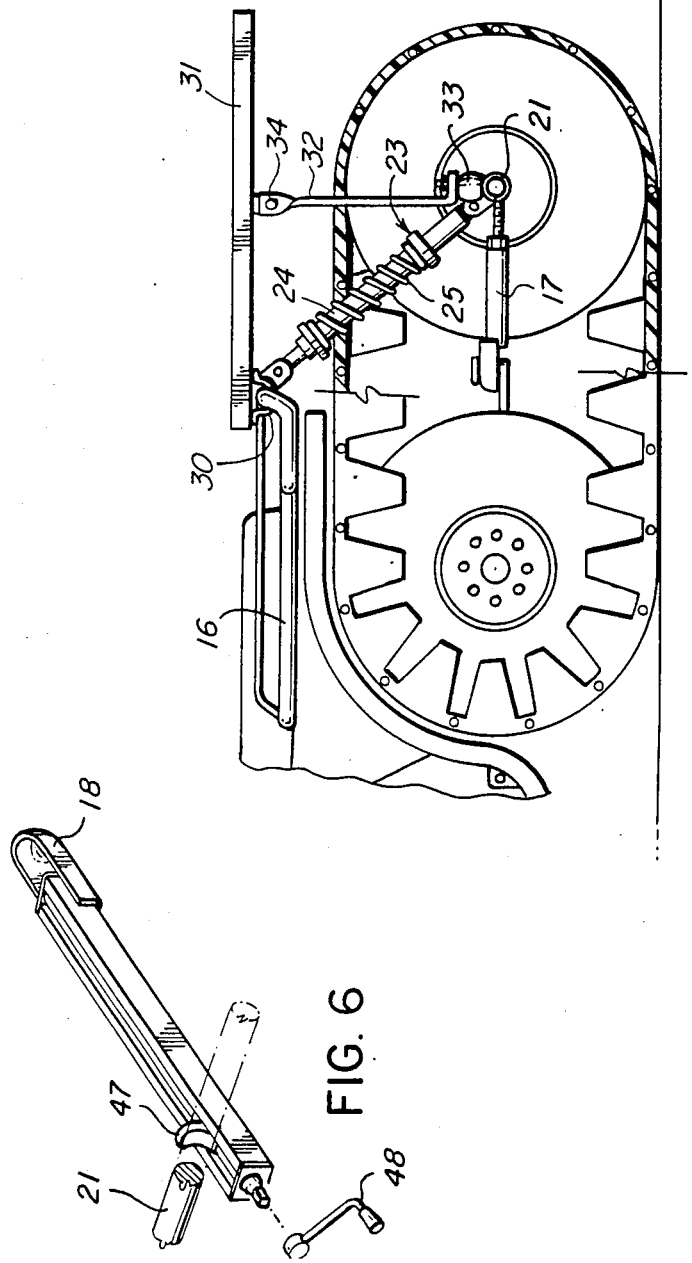

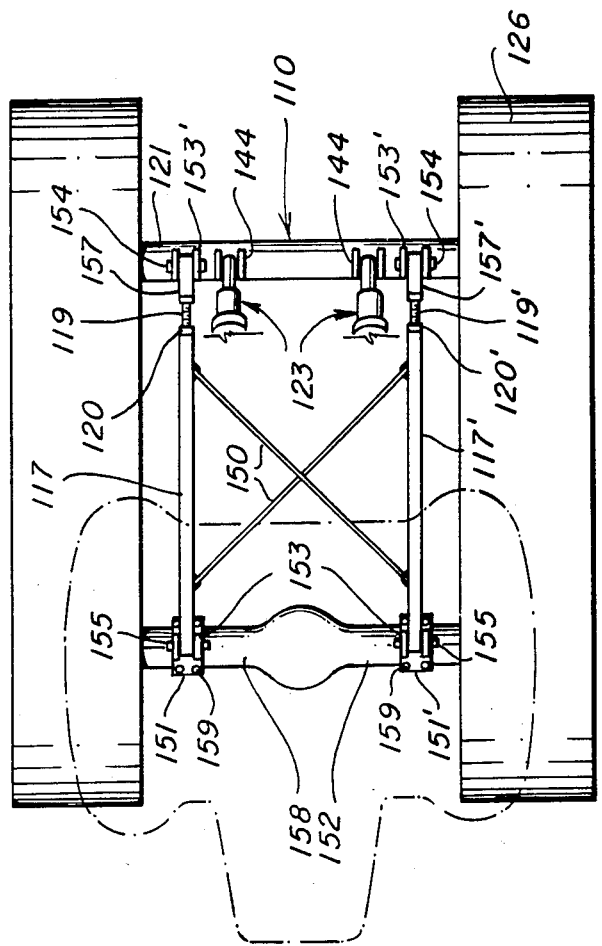
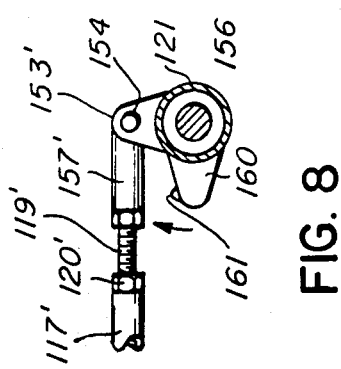
FIG. 7
FIG. 8

CONVERSION UNIT FOR ALL TERRAIN VEHICLES

BACKGROUND OF THE INVENTION

This invention relates to track laying vehicles, and in particular to conversion units for attachment to conventional powered vehicles to convert the latter to track laying vehicles.

The problem of conversion of a vehicle, such as an automobile, to a half-track vehicle has been addressed in the art. Typical prior patents are White Canadian Pat. No. 219,041, McNeill et al Canadian Pat. No. 403,861, Tolsma Canadian Pat. No. 215,937, Sedore et al Canadian Pat. No. 412,663, Christensen Canadian Pat. No. 631,722, Degroot U.S. Pat. No. 3,872,938, Copera et al U.S. Pat. No. 3,930,553, and Guibord et al U.S. Pat. No. 3,933,214.

The structure in Pat. No. 219,041 suffers from the disadvantage that substantial modification of the vehicle is required to install the tracks. In Pat. No. 215,937, substantial structure is required and once installed is difficult to remove, further, it requires substantial space beneath the vehicle and in front of the driven wheels. In Pat. No. 413,663, a permanent modification is made, substantial space is required beneath the vehicle for installation and the idler wheels apparently do not engage the ground. In Pat. No. 631,722, while the disclosed construction may be relatively simply attached to a tractor it is heavy and relatively complicated, thus being unsuitable for mass production, and a separate attachment is required for each track. U.S. Pat. No. 3,872,938 discloses a structure suitable for modification of a motorcycle, however, installation is difficult and time consuming, and the structure is designed for a single rear wheel, not lending itself to attachment to a vehicle with two rear wheels. Canadian Pat. No. 403,861 discloses a structure that can be secured to the frame of an automotive vehicle, in effect extending the frame, but it is a heavy duty construction and once installed would be difficult to remove, further, the patentee does not teach an effective spring system for the auxiliary wheels that support the track. U.S. Pat. No. 3,930,553 also discloses a permanent conversion unit, difficult to remove once installed. U.S. Pat. No. 3,933,214, while disclosing a half track attachment, teaches a complex structure, difficult to install, necessitating substantial modification of a vehicle.

The prior art fails to address the need for a lightweight conversion unit suitable for attachment to modern all terrain vehicles quickly and easily, without special tools, which is easily removed from the vehicle when it is desired to return the vehicle to its original intended use, and to which simple modifications can be made to make it suitable for a variety of different uses.

SUMMARY OF THE INVENTION

The present invention therefore provides, in one aspect thereof, a conversion unit for attachment to a powered vehicle of the type comprising a pair of driven rear wheels and a frame for supporting the rear wheels; comprising frame means for pivotable and detachable attachment to a lower portion of the vehicle between the driven rear wheels, spring strut means detachably attachable to an upper portion of the rear of the vehicle and depending therefrom, the spring strut means being pivoted to the frame means rearwardly of said attachment whereby the spring strut means bias the frame means downwardly, idler wheels, one on each side of the frame means, spaced apart by a distance corresponding to the spacing of the driven rear wheels, and a pair of endless tracks, one for each side of the unit, adapted to be trained about the driven and idler wheels.

According to another aspect of the invention, there is provided a conversion unit for attachment to a powered vehicle of the type comprising a pair of driven rear wheels and a vehicle frame supporting the driven wheels, comprising an auxiliary frame for detachable attachment to a lower portion of the vehicle between the rear wheels to extend rearwardly therefrom with transverse pivotal movement between the vehicle frame and the auxiliary frame; axle means secured to the auxiliary frame and supporting at opposite ends thereof a pair of idler wheels, the idler wheels being offset from the centre of the axle means by a distance corresponding to the offset of the driven wheels; spring strut means adapted to be detachably secured to an upper portion of the vehicle frame, and pivotally secured to the auxiliary frame or the axle at a position to bias the axle downwardly, and track means, one for each side of the vehicle, for training about the driven wheels and the idler wheels.

According to yet another aspect of the invention there is provided a conversion unit for attachment to a powered vehicle of the type comprising a pair of driven rear wheels and a vehicle frame for supporting the rear wheels, comprising: auxiliary frame means for pivotable and detachable attachment to a lower portion of the vehicle frame between the driven rear wheels, the auxiliary frame means including an axle, auxiliary wheels rotatably mounted on the axle, one on each side of the auxiliary frame; load-carrying means detachably attachable to an upper part of the vehicle frame for pivotable movement about an axis extending transversely of the vehicle; support means pivotably attached to the load-carrying means for pivotable movement about an axis extending transversely of the vehicle; the lower end of the support means being secured to the auxiliary frame means rearward of the attachment to the vehicle; the unit defining with the vehicle a four-part linkage comprising the vehicle, the load carrying means, the support means and the auxiliary frame means, whereby a load placed on the load-carrying means is supported in part by the vehicle and in part by the auxiliary wheels.

The above units are particularly intended for use with lightweight, all-terrain vehicles such as the Honda "BIG RED 200 (TM)", these vehicles being normally equipped with large balloon tires. They can be quickly and easily installed, in a matter of minutes, and can as quickly and easily be removed from the vehicles. Provision can be made for additional luggage storage space and perhaps one of the most important features of the conversion unit is the added safety that results from its use in difficult terrain. A vehicle so equipped is difficult to roll or tip. The vehicle, suitably modified, can be used without the tracks when traction is not a problem. It may also be sufficiently buoyant to float by virtue of the large balloon tires.

DESCRIPTION OF THE DRAWINGS

In the attached drawings, which illustrate embodiments of the invention,

FIG. 5 is a side elevation of a portion of the vehicle of FIG. 4, illustrating the auxiliary luggage rack;

FIG. 6 is a detail view illustrating a modification to a portion of the attachment of FIG. 1;

FIG. 7 is a plan view of an alternative embodiment of the auxiliary frame, and;

FIG. 8 is a detailed view of a part of the frame of FIG. 7.

DESCRIPTION OF THE PREFERRED EMBODIMENTS

Figure 1:
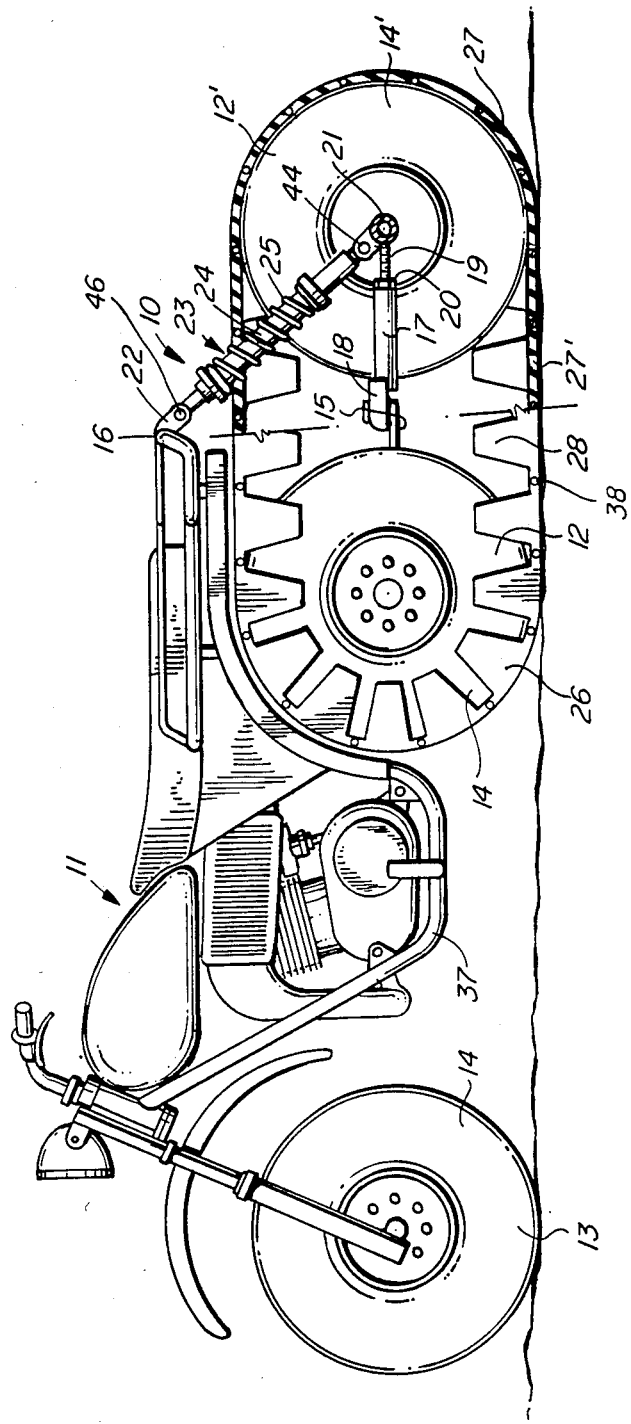
FIG. 1 is a side elevation of a three-wheeled vehicle modified by the unit of the present invention.

The conversion unit 10 of the invention is shown in the accompanying drawings attached to a three wheel, all terrain vehicle 11 having two driven rear wheels 12 and a single front wheel 13, all wheels being provided with large, balloon tires 14.

These vehicles either are equipped with, or can be equipped with, a conventional ball for a trailer hitch between the rear wheels, and approximately at the level of the axle thereof, to which normally there may be attached a trailer having a trailer hitch attachment means. These vehicles also are normally equipped with luggage racks 16 of considerable strength, disposed between the rear wheels, and secured to the vehicle frame 37. The latter is typically formed of strong tubular steel material capable of absorbing heavy loads having regard to the fact that these vehicles travel over rough terrain and therefore have to have considerable strength.

According to the first embodiment of the invention that is disclosed, an auxiliary frame comprising an adjustable tongue element 17 is provided with a hitch 18 for securement to the ball disposed between the rear wheels of the vehicle. The tongue is adjustable, for example by means of a threaded portion 19 mating with a nut 20 that is rotatable to extend or retract the tongue 17 for a purpose to be described below.

Secured firmly to the trailing end of the tongue is a transverse axle 21, which may be provided with braces 42 (FIG. 2) to prevent bending of the tongue 17 in relation to the axle 21 especially when the vehicle is used without tracks as described below. A wheel 12', with an inflatable tire 14', similar to the wheels 14 of the vehicle, is rotatably attached to each end of the axle in a manner that will be obvious to those skilled in the art. The inner ends 34 of braces 42 may be bolted to tongue 17 by bolts 35 and slots may be provided in the braces to permit adjustment of the braces 42 in relation to tongue 17. The rear ends of the braces 42 are bolted to lugs 45 secured to the axle 21.

The only modification to the vehicle 11 that is normally required is the attachment, by suitable means such as welding, of two mounting brackets 22, one on each side of the rear of the luggage rack 16. Pivotably attachable to each of these brackets 22 is a spring strut 23, which extends downwardly and rearwardly and can be pivotably secured to brackets 44 on the axle. Each strut preferably comprises a shock absorber 24 surrounded by a compression spring 25. Two such spring struts are preferred. Rubber bushings, (not shown) are provided in known manner at each end of the struts.

To install the above described unit 10 on the all terrain vehicle 11, the tongue 17 is first attached to the ball on the rear of the vehicle 11, and then, for example by bolts or suitable quick-release fasteners 46, the upper ends of the struts 23 are secured to the brackets 22 on the luggage rack 16. It may be necessary to reinforce the luggage rack 16 to absorb the loads that will be imposed on it. Thus, the auxiliary frame can move in such a manner that the auxiliary wheels are independently suspended in relation to the vehicle wheels, i.e., both vertical and twisting movement is possible.

Rubber or plastic tracks 26 of the type used, for example, in the "Argo" (TM) tracked vehicle are suitable for use with the present invention. These tracks comprise a broad band 27 formed from individual segments 27' secured pivotably together by pins 38 and are well known in the art. From the sides of the segments 27' lugs 28 extend inwardly; these lugs 28 serve to maintain the tracks 26 in position over the wheels 12, 12' about which they are trained. When the tracks 26 are trained about the wheels 12 of the vehicle, and about the wheels 12' of the conversion unit, they may be tightened by rotating the nut 20 on the threaded portion 19 of tongue 17 thus to extend the tongue 17 and increase the distance between the rear wheels of the vehicle and the axle 21 of the conversion unit. The vehicle is then ready for use as a half-track vehicle.

If the vehicle is to be used in snow, it is desirable to attach a ski (not shown) to the front wheel 13 in a manner shown, for example, in prior U.S. Pat. No. 3,872,938 to which reference is made above. The ski may also be of the type that comprises a slot into which the front wheel may extend so that the wheel is available for use as such on hard terrain, while the ski is useful on soft snow.

Figure 2:
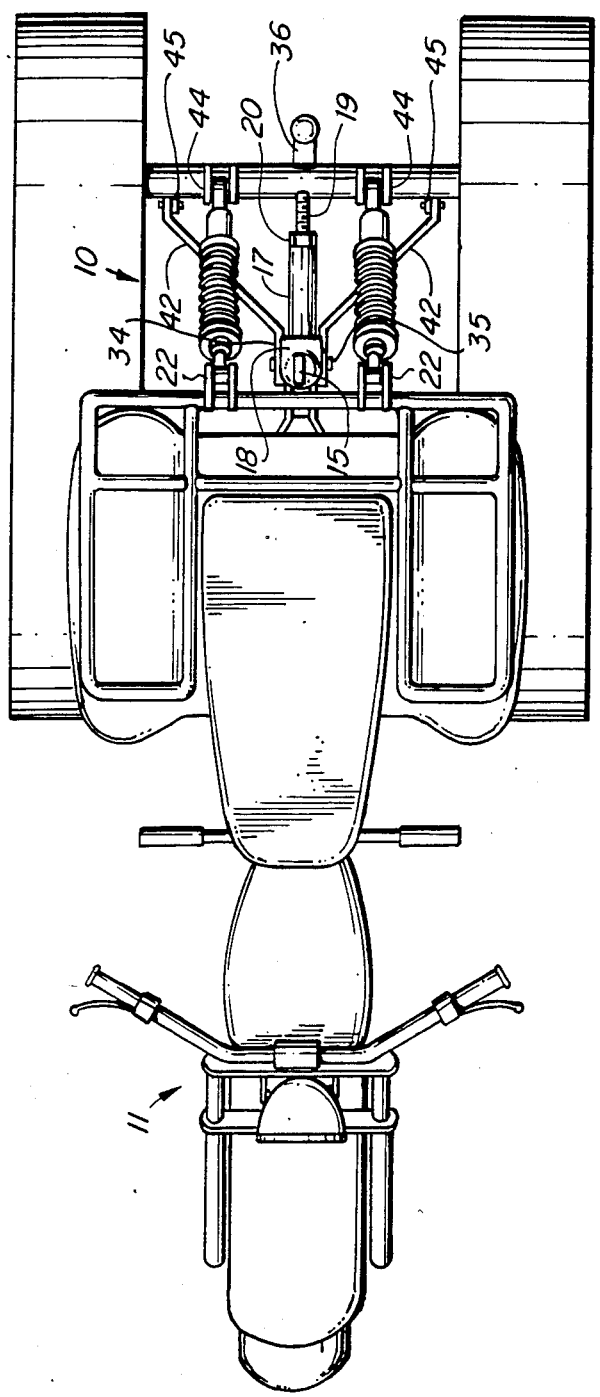
FIG. 2 is a plan view of the vehicle of FIG. 1.

A ball for a trailer hitch may be secured to the axle 21 at 36. (FIG. 2)

Figure 4:
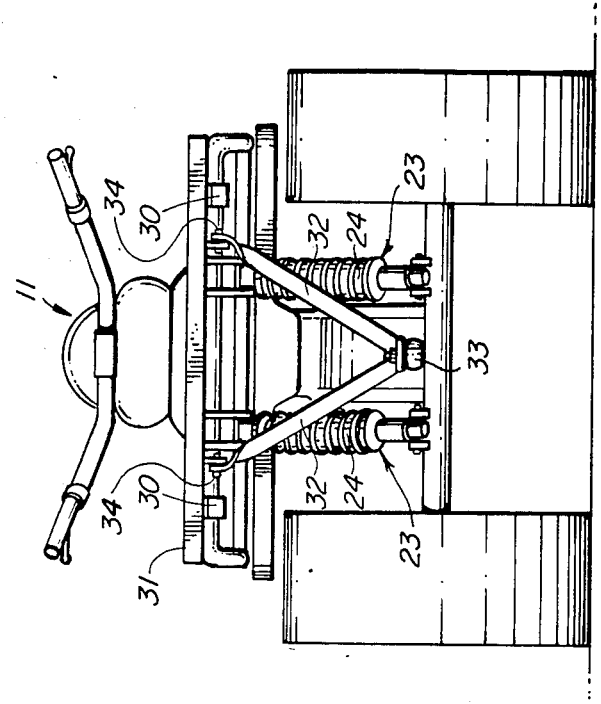
FIG. 4 is a rear view of the vehicle of FIG. 1, further including an auxiliary luggage rack.
Figure 3:
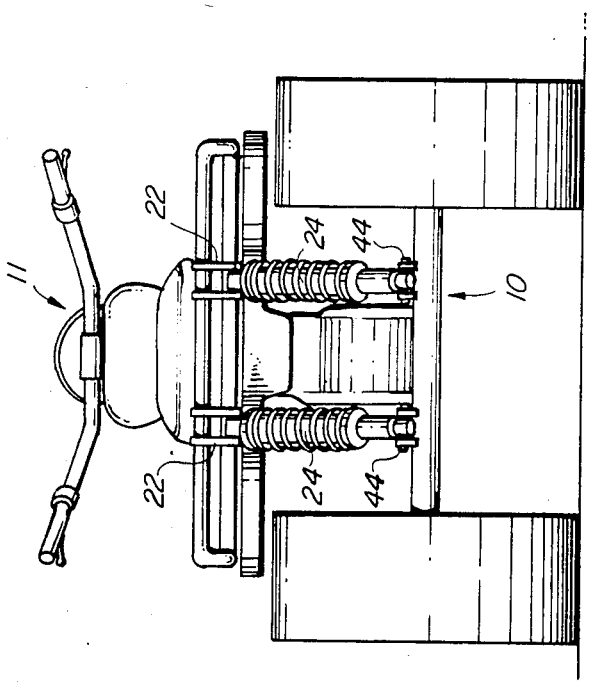
FIG. 3 is a rear view of the vehicle of FIG. 1.

The unit described above provides for a variety of alternate uses. For example, referring to FIGS. 4 and 5 a second set of brackets 30 may also be mounted on the luggage rack 16. To the second set of brackets 30 may be secured an auxiliary luggage rack 31 pivotable about an axis transverse to the vehicle 11. Stays 32, disposed about half way along the auxiliary luggage rack, extend downwardly and inwardly to a ball joint 33 secured centrally of the axle 21. This auxiliary luggage rack 31 can support a substantial weight directly above the auxiliary wheels 12'. The stays 32 are also pivoted at 34 to swing about an axis transverse to the vehicle. Safety is enhanced, because it is almost impossible for the vehicle to rotate about its rear wheels backward, a common problem with all-terrain vehicles when heavily loaded. If the auxiliary luggage rack 31 and its associated stays 32 are used, the vehicle can operate without its tracks, with the rack 31 and the auxiliary rear wheels 12' operating more or less as a trailer, in the event that extra traction afforded by the tracks 26 is not required. It is also possible to remove the spring struts 23, if the luggage rack 31 is used to increase the carrying capacity of the basic vehicle and further, as described above, to increase the safety of the vehicle. The spring struts 23 may also be secured to the auxiliary luggage rack closely adjacent its point of attachment to rack 16.

It will be seen from the above that the central object, of providing a cheap, easily installed and removed track attachment for a vehicle has been satisfied and that unskilled persons may easily attach and remove the unit from a vehicle, without special tools and without special knowledge. Of course, instead of the nuts and bolts mentioned as suitable means for attaching the struts to the luggage rack, quick fasteners can be used which, along with the conventional trailer hitch, can eliminate entirely the need for tools. Instead of the illustrated threaded shaft and nut tensioner assembly for the tongue, there can be provided a unit similar in construction to a bumper jack, as shown in FIG. 6, with the trailer hitch 18 being secured to the foot of the jack and the axle 21 secured to the lifting portion 47 of the jack. The handle 48 of the jack, left in place, can be used for easy rotation and thus adjustment of the tongue 47. Other like constructions will be obvious to those skilled in the art, bearing in mind the central objective of ready adjustment of the length of the tongue to adjust the tension of the track.

Rubber or plastic fenders can be secured above the tracks to protect the user from flying dirt from the tracks. The spring struts 23 are provided with the rubber bushings where these are secured to brackets 22 and 30, to provide for limited universal movement, but other mounting means providing for such movement will occur to those skilled in the art.

In FIGS. 7 and 8, there is illustrated an alternative form of the auxiliary frame illustrated in FIGS. 1 through 6.

The auxiliary frame 110 of the additional embodiment is suitable for use with vehicles in which there is a solid rear axle 158 to which the auxiliary frame 110 may be secured.

In this embodiment, two tongues 117, 117' replace the single tongue 17 of the first embodiment. A rear axle 121 is provided. The details of attachment of the auxiliary frame 110 to the vehicle and the features of construction, to the extent that they are similar to the first embodiment, will not be described.

A pair of clamps 151, 151' may be bolted to the rear axle 152 by bolts 159. Welded to the clamps 151 are pairs of lugs or brackets 153, perforated to receive bolts or quick-release fasteners 155. The front ends of the tongues 117, 117' are attached to the brackets 153 by bolts, or preferably swivel pins 155 of known type that are held in place by clips and can quickly be inserted and removed. As with the first embodiment, the auxiliary rear axle 121 is provided with mounting brackets 144 to which spring struts 123 may be attached by bolts through rubber bushings. Also welded to the axle 121, outwardly of the brackets 144, are pairs of lugs or brackets 153'. Tongues 117, 117' are adapted to be pivotably bolted to each of the sets of brackets 153' for limited universal movement. The two tongues 117, 117' define with the rear axle 121, and a pair of cross braces 150, a rectangular frame. The cross braces 150 are flexible, and are welded or otherwise suitably secured to the tongues 117, 117'.

Each tongue 117, 117' is divided into front and rear portions, the rear portions being identified by the reference numerals 157 and 157'. Secured to the portions 157 and 157' are threaded elements 119, 119' upon which are threaded nuts 120 and 120'. The combination of the threaded portions 119, 119' and the nuts 120, 120' permit adjustment of the length of the tongues 117, 117' as in the embodiment of FIGS. 1 through 6.

The above described construction provides a rectangular, horizontally rigid frame that allows the rear axle 121 to pivot about an axis extending longitudinally of the vehicle, i.e., the rear axle 121 can swing about the longitudinal axis independently of the vehicle axis 158.

Referring to FIG. 8, it will be appreciated that due to tension on the tracks there will be a tendency for the rear axle 121 to rotate, about the bolts 154, forwardly. To limit such rotation, a forwardly extending arm 160 is provided on the axle 121 beneath each of the portions 157, 157' of the tongue elements 117, 117'. Such rotation is resisted by the arm 160, each of which may be provided with a rubber bumper 161 to engage the respective portions 157, 157'.

With the above described embodiments, driving of all four wheels is possible if sprockets are attached to the insides of the wheels, connected by drive chains.

What we claim as our invention is:

1. A conversion unit for attachment to a powered vehicle of the type comprising a pair of driven rear wheels and a vehicle frame for supporting the rear wheels, comprising:

auxiliary frame means for pivotable and detachable attachment to a lower portion of the vehicle between the driven rear wheels, the auxiliary frame means including an axle and auxiliary wheels rotatably mounted on the axle, one on each side of the frame;

load-carrying means detachably attachable to an upper part of the rear of the vehicle for pivotable movement about an axis extending transversely of the vehicle;

support means pivotably attached to the load-carrying meanas for pivotable movement about an axis extending transversely of the vehicle;

the lower end of the support means being secured to the auxiliary frame means rearward of the attachment to the vehicle;

the unit defining with the vehicle a four-part linkage comprising the vehicle, the load carrying means, the support means and the auxiliary frame means, whereby a load placed on the load-carrying means is supported in part by the vehicle and in part by the auxiliary wheels.

2. A unit as claimed in claim 1 wherein the auxiliary frame means comprises adjustment means for varying the distance between the attachment and the idler wheels to adjust the tension of the tracks, when in place.

3. A unit as claimed in claim 1 further including spring strut means detachably attachable to the upper part of the vehicle frame and to the auxiliary frame means rearwardly of the attachment for biasing the auxiliary frame means downwardly.

4. A unit as claimed in claim 3 wherein the spring strut means include a shock absorber.

5. A unit as claimed in claim 1 further comprising a pair of endless tracks, one for each side of the unit, adapted to be trained about the driven and idler wheels.

6. A unit as claimed in claim 1 wherein the attachment comprises a ball hitch with the ball secured to the vehicle frame and the socket secured to the auxiliary frame means.

* * * * *